United States Patent
Hauler

(10) Patent No.: US 9,950,665 B2
(45) Date of Patent: Apr. 24, 2018

(54) METHOD AND DEVICE FOR AUTOMATICALLY STOPPING A MOTOR VEHICLE THAT IS AT LEAST INTERMITTENTLY AUTOMATICALLY GUIDED ON A ROUTE

(71) Applicant: Robert Bosch GmbH, Stuttgart (DE)

(72) Inventor: Florian Hauler, Linkenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/606,228

(22) Filed: May 26, 2017

(65) Prior Publication Data

US 2017/0341575 A1   Nov. 30, 2017

(30) Foreign Application Priority Data

May 27, 2016   (DE) .......................... 10 2016 209 203

(51) Int. Cl.
| | |
|---|---|
| *B60Q 7/00* | (2006.01) |
| *B60Q 1/30* | (2006.01) |
| *G05D 1/02* | (2006.01) |
| *G09F 13/16* | (2006.01) |

(52) U.S. Cl.
CPC .............. *B60Q 7/005* (2013.01); *B60Q 1/30* (2013.01); *G05D 1/0212* (2013.01); *G09F 13/16* (2013.01)

(58) Field of Classification Search
CPC .. B60C 7/005; B60C 1/30; G05D 1/00; G08B 1/202
USPC ...... 340/473, 425.5, 438, 901, 5.72; 701/23, 701/36, 41, 44
See application file for complete search history.

(56) References Cited

U.S. PATENT DOCUMENTS

| | | | |
|---|---|---|---|
| 7,894,951 B2 * | 2/2011 | Norris ..................... | H04L 67/12 180/443 |
| 8,718,861 B1 * | 5/2014 | Montemerlo ......... | B60W 30/00 701/26 |

FOREIGN PATENT DOCUMENTS

DE          10220782 A1    11/2003

* cited by examiner

*Primary Examiner* — Tai T Nguyen
(74) *Attorney, Agent, or Firm* — Norton Rose Fulbright US LLP; Gerard Messina

(57) ABSTRACT

A method and device, for a vehicle that at times is automatically guided by an autonomous guidance in which an intervention by the driver is not required, includes a continual checking of whether the automatic vehicle guidance is able to be maintained in the future or whether it must be terminated. In the event that the automatic vehicle guidance must be terminated, the vehicle is transitioned into a stopping procedure. A standstill position of the vehicle in the stopping process is pre-calculated and a warning triangle mounted on the vehicle is launched, so that the warning triangle is positioned at a predefined minimum distance from the standstill position.

17 Claims, 3 Drawing Sheets

METHOD AND DEVICE FOR AUTOMATICALLY STOPPING A MOTOR VEHICLE THAT IS AT LEAST INTERMITTENTLY AUTOMATICALLY GUIDED ON A ROUTE

CROSS-REFERENCE TO RELATED APPLICATIONS

The present application claims priority under 35 U.S.C. § 119 to DE 10 2016 209 203.0, filed in the Federal Republic of Germany on May 27, 2016, the content of which is hereby incorporated by reference herein in its entirety.

FIELD OF THE INVENTION

The present invention relates to a method and to a device for the autonomous guidance of a motor vehicle that is at least intermittently automatically guided on a route, where no intervention by the driver is required during the automatic vehicle guidance.

BACKGROUND

An emergency system for motor vehicles is known from the document DE 102 20 782 A1, in which a driver-monitoring system identifies a driver's unfitness to drive, which is forwarded to a control unit for the controlled deceleration of the vehicle in a case of an identified unfitness to drive. The control unit is combined with a driver-assistance system that includes a sensor system for sensing a traffic environment.

SUMMARY

A disadvantage of this related art is that when the driver-monitoring system identifies a driver's unfitness to drive and the vehicle is safely parked at the edge of the road, the following traffic is not alerted to this stopped vehicle and warned. However, according to the road traffic act, this is useful and increases the safety of all road users.

Embodiments of the present invention provide a method and a device by which the disadvantage of the related art is overcome in that a system determines the standstill position in advance during a stopping operation, and a warning triangle is automatically set up at a sufficient distance from the standstill position so that the driver and the following traffic are warned of the standing vehicle.

For example, a motor vehicle is at least intermittently automatically guided on a route with autonomous guidance, where no intervention by the driver is required during the automatic vehicle guidance. During the automatic vehicle guidance, it is continuously checked whether the automatic vehicle guidance is able to be maintained in the future or whether it must be terminated. In the event that the automatic vehicle guidance must be terminated, the device automatically transfers the vehicle into a stopping operation. Here, it is additionally provided that the standstill position of the vehicle in the stopping operation is calculated in advance and a warning triangle mounted on the vehicle is set down during the stopping operation, so that the warning triangle is positioned at a sufficient distance from the standstill position of the vehicle, which may be a predefined minimum distance.

In an advantageous manner, the stopping state includes a deceleration of the vehicle and stopping of the vehicle at the road or lane edge or in an emergency lane. The stopping state within the context of the present invention is a vehicle state that is initiated if it has been determined that the automatic vehicle control must be handed back to the driver in the near future and the driver, due to lack of feedback or a failure of the driver to take control of the vehicle guidance, is not available for the further driving task. In this case, the stopping state, during which the vehicle is safely parked at the edge of the road or in an emergency lane or in the traffic lane, is initiated by slowly decelerating the vehicle, possibly automatically carrying out a lane change, and braking the vehicle into the standstill state. Once the vehicle has come to a standstill, the stopping state is ended and an emergency call to a service center can possibly be placed, depending on the circumstances.

Here, it is particularly advantageous that when the stopping state of the vehicle is activated and it is therefore foreseeable that the vehicle will soon be parked at the edge of the road or in an emergency lane, the hazard warning flashers of the vehicle are already turned on when the stopping state is activated. Following vehicle drivers are therefore warned that the vehicle driving in front is slowly decelerating and will come to a standstill at the edge of the road.

In addition, it is advantageous that prior to being launched, a warning triangle, which is accommodated in a holder on the vehicle bottom or on the vehicle rear, is automatically launched by releasing a catch or by opening a lock of the holder. By providing the holder on the vehicle bottom or on the vehicle rear, the warning triangle is able to be launched without the launched warning triangle damaging the vehicle at the undercarriage or at other frame parts.

It is furthermore advantageous that the warning triangle is launched by releasing the triangle from the holder on the vehicle rear or the vehicle bottom.

In addition, it is advantageous that the warning triangle is launched by expelling the warning triangle from a sleeve. For example, the warning triangle can be launched in that it is accommodated in a sleeve and a propelling charge, for instance, is additionally provided in the sleeve, which is ignited when the warning triangle is launched. Because of the propelling charge, the warning triangle inside the sleeve is pushed out of the sleeve and thus launched automatically. Additional variants consist of providing a rod which pushes the warning triangle out of the sleeve during the launching with the aid of a drive. Such a rod with drive can be developed similar to a piston, which carries the sleeve content toward the open end and launches it from the sleeve. It is furthermore conceivable that the warning triangle is expelled from the sleeve by tilting the sleeve. For example, a drive can be provided that, when launching the warning triangle, tilts the sleeve in such a way that the open end, originally located on the upper side, is rotated downward by tilting the sleeve, whereupon the warning triangle slips out of the sleeve on its own due to the force of gravity. Furthermore, it is especially advantageous that the warning triangle is expelled from the sleeve in that the sleeve is mounted on the vehicle so that the open end of the sleeve is pointing down and the warning triangle is prevented from slipping out of the sleeve during a normal driving operation only by the provision of a latching device, for instance in the form of a bolt or a cap, which is released when the warning triangle is launched and lets the warning triangle slip out of the sleeve on its own when the lock is released. This can advantageously be facilitated by a preloaded spring in the sleeve, which pushes the warning triangle out of the sleeve upon the release.

It can advantageously be provided to make the sufficient distance between the pre-calculated stopping position and the launch location of the warning triangle dependent upon the type of road on which the travel is taking place. In this context, it is particularly advantageous if the type of traveled road is determined by allocating to the currently traveled road one of the classes "inner-city road," "city road," "country road," or "multi-lane road." For example, it can furthermore be provided that when the currently traveled road has been identified as a "city road," the distance between the pre-calculated stopping position and the set-up location of the warning triangle amount to approximately 50 meters and, in particular, to at least 50 meters. In addition, it is particularly advantageous that when the street type "country road" is detected, the distance between the pre-calculated stopping position and the set-up location of the warning triangle amount to approximately 100 meters and, in particular, to at least 100 meters. Moreover, it is advantageous that when the currently traveled road is identified as an expressway or an interstate highway developed similar to an expressway, the road type "multi-lane road" is inferred and the distance between the pre-calculated stopping position and the set-up location of the warning triangle of approximately 200 meters and, in particular, at least 200 meters, is ensured.

It is advantageously provided that the type of traveled road is determined by the supply of information from a navigation system or by analyzing a camera that is installed in the vehicle and oriented in the driving direction. In addition to the geo-coordinates of the listed roads, modern navigation systems include supplementary information which, for example, pertains to the number of traffic lanes the currently traveled road has or whether the currently traveled road section is located within or outside of the city limits. It is especially advantageous if an available camera that records and analyzes the surrounding area in front of the own vehicle, is utilized for determining the road type. In this way, the evaluation of the video information, which is analyzed for a lane change warning or a lane change assistant, for example, additionally provides information about the number of traffic lanes the currently traveled road includes and/or which traffic lane the own vehicle is currently traveling in, and/or the roadside structures of the road or the colors of the information signs are analyzed by the camera.

Within the scope of the present invention, the term "sufficient distance" is to be understood as relating to a predefined minimum distance.

In addition, it is advantageous that the warning triangle is in a folded-up state when launched. This makes it possible to store the warning triangle in an especially space-saving manner in the ejection sleeve of the vehicle and to protect it from damage and dirt.

It is furthermore advantageous that the folded-up warning triangle unfolds automatically after being placed. To ensure this, preloaded springs that shift parts of the warning triangle in relation to one another during the unfolding and thus open up the warning triangle, can be installed. In an example embodiment, a gas cartridge, e.g., a $CO_2$ cartridge, which expands its gas to unfold the warning triangle and pneumatically or hydraulically unfolds parts of the warning triangle, is provided in the warning triangle. It is furthermore conceivable that that the gas cartridge that expands its contained gas inflates a spatially sealed container, and the warning triangle assumes its unfolded form through the inflation process and retains its form until the triangle is folded up.

It is furthermore advantageous that the warning triangle is developed in such a way that it is brought into the correct set-up position on its own while unfolding. When speaking of the unfolding of the warning triangle within the scope of the present invention, this means the unfolding of the warning triangle after its launching, so that it is able to fully perform its warning function. For example, the automatic assumption of the correct set-up position of the warning triangle can be achieved by designing the warning triangle according to the roly-poly principle; in other words, it has a center of gravity that sits very low in relation to its physical form and possibly has a footprint that is bent convexly so that, due to its uncoordinated movement by the launch, the warning triangle comes to lie in the correct position on the road after coming to rest on the road. It can furthermore be provided that the warning triangle has legs that can be unfolded, similar to a tripod. By unfolding the legs, the warning triangle, which may possibly not be correctly situated for the proper unfolding, is rotated into the correct position by the unfolding legs, so that it is rotated into the intended position after the legs have fully unfolded.

In addition, it is advantageous that the warning triangle is designed in such a way that the warning surface of the warning triangle orients itself counter to the driving direction when unfolding.

It is also advantageous that the warning triangle is developed as a tetrahedron shape and has three identical warning sides, each one of the three warning sides including warning symbols and/or reflectors. For this purpose, the warning triangle can have three warning sides on its tetrahedron, so that the fourth side constitutes the base surface of the tetrahedron on which the warning triangle comes to lie or stand after being launched and unfolded. In particular the fact that the center of gravity of the warning triangle lies close to this base surface, and thus not on the surfaces of the tetrahedron that are part of the warning sides, makes this possible. In this case the tetrahedron is constructed in such a way that the center of gravity lies as closely as possible to or within the relatively heavy base surface, or that it lies within the relatively heavy base surface, in comparison with the warning sides.

It is also advantageous that the warning triangle has a radio transmitter which is activated during the launch and emits a radio signal. In addition, it is advantageous that the radio transmitter establishes a vehicle-to-vehicle connection or a vehicle-to-infrastructure connection and the current position is transmitted to the receiving vehicles or to the receiving data server. Because of the vehicle-to-vehicle connection, following vehicles are able to be warned directly via a radio signal, so that the following vehicles are already warned of the broken-down vehicle before the broken-down vehicle becomes visible. Providing a vehicle-to-infrastructure connection makes it possible to transmit the information of the broken-down vehicle as well as its geo-coordinates to a central data server, which makes this information available to other road users; these road users are therefore able to be warned of the broken-down vehicle in a timely manner, thus increasing the safety of all road users. It is furthermore advantageous that the stopped vehicle, which has a vehicle-to-infrastructure connection as it is, receives the radio signal of the warning triangle and makes the radio signal available, possibly with additional geo-coordinates, to other road users via an additional transmit and receive device. This provision to other road users, for example, can take place by using a vehicle-to-vehicle connection and/or by using a vehicle-to-infrastructure connection. If the connection has not yet already been established for the driving operation anyway, it will be established by the broken-down vehicle, and data are transmitted to other vehicles in the environment of the own vehicle or transmitted to a central data server.

In addition, it is possible to transmit the exact geo-position of the set-up warning triangle to the own broken-down vehicle using a low-power radio transmitter in the warning triangle; this vehicle can then use a more powerful radio connection that realizes greater ranges for directly transmitting the geo-coordinates of the warning triangle to other road users via a vehicle-to-vehicle connection, or for transmitting them via a vehicle-to-infrastructure connection to a data server. The data server in turn makes the geo-coordinates of the warning triangle available to other road users as a data service.

According to an example embodiment, a control element is provided for a control unit of an autonomous vehicle guidance of a motor vehicle. A program is stored on the control element, which is able to run on a computing device, in particular on a microprocessor or a signal processor, and is suitable for executing the method of the present invention. In this case, a program that is stored in the control element therefore realizes the present invention, so that this control element provided with the program realizes the present invention in the same way as the method for whose execution the program is suited. In particular an electric memory medium such as a read-only memory can be used for the control element.

Additional features, application possibilities and advantages of the present invention result from the following description of exemplary embodiments of the present invention which are shown in the figures of the drawing. All described or illustrated features constitute the subject matter of the present invention, on their own or in any combination and regardless of their combination in the patent claims or their antecedent reference and also regardless of their wording or representation in the description and the drawing.

Hereinafter, exemplary embodiments of the present invention are described on the basis of the drawing.

DETAILED DESCRIPTION

Figure 1:
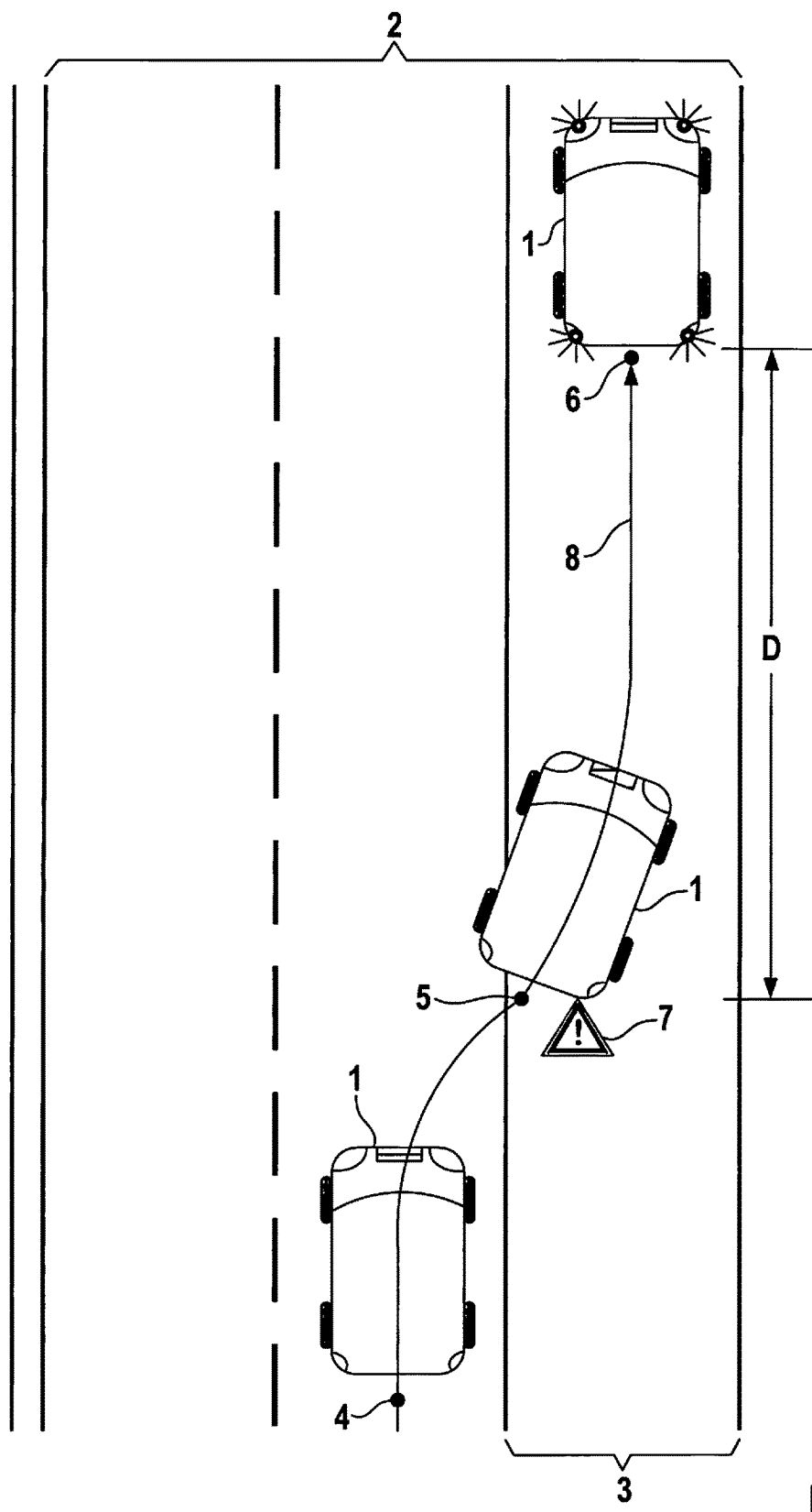
FIG. 1 schematically shows a driving situation to illustrate a method and device according to example embodiments of the present invention.

FIG. 1 shows a vehicle 1, which is moving on an exemplary multi-lane road 2, at different points in time by way of example. Multi-lane road 2 is depicted by two traffic lanes for one direction as well as an emergency lane 3 on the right side. Vehicle 1 is moving on multi-lane road 2, advantageously using an autonomous driving mode. An autonomous driving operation or a highly automated driving operation means that all driving tasks are performed by systems of vehicle 1 and the driver does not have to intervene in the driving operation. In the highly automated driving operation, the driver is available merely as a fallback level; in other words, if the system recognizes that it will no longer be able to carry out the future driving task on its own, a take-control prompt (TCP) is output to the driver of vehicle 1 who must then perform tasks of the vehicle control of vehicle 1 within a specific period of time. Furthermore, if the vehicle guidance system detects that the system is no longer able to manage the future driving task automatically and if the driver has not taken control of the driving task by the end of the take-control period, then it will be necessary to bring the vehicle into a safe state in a timely manner in order not to endanger either the passengers of vehicle 1 or other road users. This state into which vehicle 1 is transferred is advantageously the standstill of the vehicle, for which the vehicle must be stopped in such a way that it does not pose a safety obstacle to other road users.

Within the scope of the present invention, the phase during which the vehicle is transferred into the safe state is referred to as the stopping state. While passing through this stopping state, vehicle 1 is guided along route 8 and controlled by an action on the brakes of the vehicle and/or the vehicle-drive devices as well as by an intervention in vehicle-steering system 8.

This stopping state can begin with the outputting of the take-control prompt TCP and be ended as soon as vehicle 1 reaches the standstill state. During this stopping state, the speed of vehicle 1 is reduced, the vehicle is possibly steered toward the edge of the road and safeguarded in such a way that it is safe for following vehicles. The safeguarding of the vehicle can include setting up a warning triangle 7, by placing an emergency call, by switching on the hazard warning lights of vehicle 1, and by transmitting the own position coordinates to a data server, which keeps the positional data of broken-down vehicle 1 in readiness for a call-up by following vehicles.

Vehicle 1 moving in lane 2 has determined at a preceding instant that the future driving task can no longer be managed and has output a take-control prompt to the driver in optical, acoustic or haptic form, for instance because the automatic vehicle guidance must be terminated since the vehicle has identified a technical defect in the vehicle within the framework of self-monitoring, and thus can no longer perform the driving task in the future. It is also possible that an upcoming traffic situation was identified that is so complex that the vehicle control for the automatic or autonomous vehicle guidance can no longer manage it on its own, or detailed map information for sensor system 12 is unable to be made available. The take-control prompt for the driver can be output optically, e.g., by a display or a warning lamp, acoustically, e.g., by a warning tone, haptically, e.g., by shaking the driver seat, or kinetically, e.g., by generating a brief braking jerk.

If the driver has not reacted during take-control period t after the take-control prompt was output, for instance because the driver has fallen asleep or is suffering from health problems, then the stopping state is started after the take-control period has elapsed, vehicle 1 being exemplarily located at position 4 at the beginning of the stopping state. Within the scope of the stopping state subsequently unfolding and after passing starting position 4, the vehicle is no longer accelerated further but rolls to a stop or is even actively decelerated. During the deceleration, vehicle guidance system 10 of vehicle 1 calculates a future standstill position 6 and steers vehicle 1 to identified emergency lane 3 in a timely manner in order to park the vehicle in such a way that it does not pose a safety risk to the following traffic. For this purpose, vehicle 1 is steered onto the emergency lane and an automatically unfolding warning triangle 7 is dropped off when passing position 5 which is located approximately at a distance D from pre-calculated standstill position 6, warning triangle 7 unfolding at position 5 during the stopping state of vehicle 1. Vehicle 1 continues to execute its stopping state. To do so, vehicle 1 continues to decelerate and reaches standstill at position 6, where the stopping state is ended and the vehicle is parked in a manner that is safe for traffic. For instance, the hazard warning flashers of vehicle 1 can now be additionally activated. As an alternative or in addition, an emergency call can be placed in which the GPS location coordinates are transmitted to a server or further emergency measures are carried out. As an alternative, the activation of the hazard warning flashers is also already possible when passing position 4. Because of the pre-calculation of standstill position 6, it is possible to calculate position 5, where automatically unfolding warning triangle 7 was launched, in such a way that it is set up approximately, or as a minimum, at distance D from standstill position 6.

The method described in FIG. 1 is not necessarily restricted to the automatic vehicle guidance of an autonomous vehicle; instead, if a vehicle defect or a health problem of the driver of vehicle 1 is detected, it can also be supplemented and carried out in a meaningful manner within the framework of a conventional vehicle guidance through a driver activation of the accelerator, the brake pedal and the steering wheel.

Figure 2:
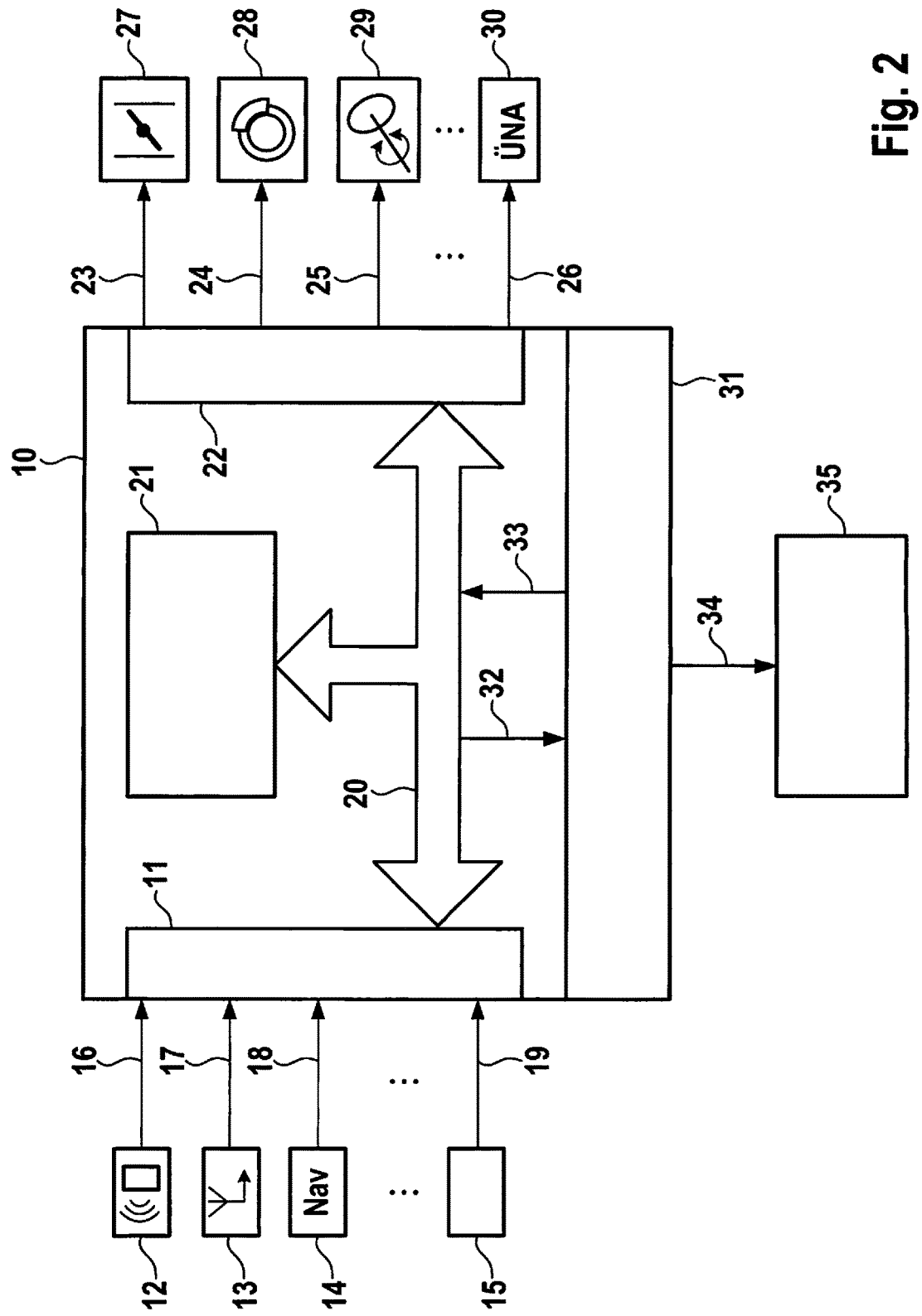
FIG. 2 is a schematic block diagram of a device according to an example embodiment of the present invention.

By way of example, FIG. 2 outlines a device by which the present invention is able to be realized. In this context, a device 10 for the autonomous vehicle guidance is shown, which is equipped with an input circuit 11. Among others, the output signal of a first sensor, e.g., of an environmental sensor system, is provided by input circuit 11 to device 10 for the automatic vehicle guidance as an input signal. Here, environmental sensor system 12 can be a system made up of one or a plurality of sensor(s) on the basis of video, radar, ultrasound or lidar, or a combination thereof. Environmental sensor system 12 detects objects in the detection range of the environmental sensor system and evaluates the received signals in such a way that object data are able to be supplied to device 10 as output data 16. In addition, the signal from another sensor 13, such as a receive antenna for infrastructure data, is supplied to input circuit 11 of device 10 for the autonomous vehicle guidance. These signals 17 including infrastructure data are data provided by a central or a local data server, for example, and can involve information that pertains to environment objects and that changes rapidly over time, or which can be additional navigational data. In addition, input signal 18, which is the output signal of a navigation system 14, for instance, is supplied to input circuit 11 of device 10 for the autonomous vehicle guidance. For example, navigation system 14 can provide information required by vehicle 1 for route planning purposes. These data of navigation system 14, which are made available by signal 18 of input circuit 11, can be stored locally in vehicle 1 or can be called up from a data server via an infrastructure service. Additional signals 19, which come from additional sensors 15, are conceivable as input signals of input circuit 11. For instance, these can be sensors 15 for the highly precise positioning of vehicle 1, or data that are received from other vehicles via a car-to-car interface and taken into account for the control of the own vehicle speed, or data pertaining to the driver's state of health.

Input signals 16, 17, 18, 19 supplied to input circuit 11 are forwarded to a calculation device 21 with the aid of a data-exchange device 20, which can be developed as a bus system, for instance. This calculation device 21 is able to be implemented as a microprocessor or signal processor, for example, and can allow the method of the present invention to run in the form of a software program. Output signals 23, 24, 25, 26, ascertained by calculation device 21 as a function of supplied input signals 16, 17, 18, 19, are forwarded via data-exchange system 20 to an output circuit 22, which outputs output signals 23, 24, 25, 26 to downstream control elements 27, 28, 29, 30. For example, output circuit 22 outputs an output signal for vehicle drive 23 to a power-determining control element of drive 27. The power-determining control element of drive 27 can be, for example, the throttle valve of the engine or a fuel-metering device or a driver circuit for an electrical drive.

In addition, output circuit 22 outputs an output signal 24 for vehicle deceleration system 28. Vehicle deceleration system 28 can be an electrically controllable brake device but also an electronic stability system that is able to brake the vehicle in a metered manner, or a driver circuit for an electrical drive that is able to be operated in a braking operation.

In addition, output circuit 22 outputs an output signal 25 for steering device 29, which acts on an electric motor of the power steering system, for instance, and is able to influence the driving direction of the vehicle. It is furthermore also conceivable that an electronic stability control system is actuated by output signal 25 for steering device 29, in such a way that it brakes only individual wheels and thereby modifies the driving direction of vehicle 1.

In addition, to further output signals that are output to other downstream control elements, it is also possible to output an output signal 26 for a take-control prompt (TCP) 30 for the driver, which informs the driver in an optical, acoustic, haptic or kinetic manner that the vehicle guidance system will no longer be able to guide the vehicle on its own and that an intervention by the driver is required for the further and safe guidance of the vehicle. The driver take-control prompt can also consist of a combination of the illustrated possibilities.

Furthermore, a stopping control 31 is provided as part of device 10 for the autonomous vehicle guidance, which controls the stopping state of vehicle 1 and is also acting on the vehicle control during this time. For example, if device 10 for the vehicle control recognizes that the vehicle-guidance task will no longer be able to be carried out autonomously, then a take-control signal 26 is output to take-control prompt 30, which is then output to the driver. During a specific time period t, which can also be varied and can depend on the degree of the current risk of the current driving situation, for example, the driver of vehicle 1 is now able to take control of the driving task. For this purpose, data-exchange device 20 outputs an activation signal 32 to stopping control 31, for instance, which then waits for a driver to take control. If the driver takes control of the driving task during this time, for example by operating an actuating element or by actively intervening in the driving operation by operating the brake pedal, the accelerator or the steering system, then the automatic driving mode will be terminated, and the driver can continue to control the vehicle manually in the conventional manner. In this case, device 10, in particular the method for the vehicle control, as well as stopping device 31 are deactivated. In the event that the driver fails to take control of the driving task during time period t, stopping control 31 returns stopping signal 33 to data-exchange system 20 after time period t has elapsed. In response, the stopping state is begun at position 4, and vehicle 1 is braked along the route and transferred into the safe standstill state at position 6. To do so, standstill position 6 is calculated in advance during the stopping state, and a distance D at which the warning triangle is to be set up before standstill position 6 is determined as a function of an implemented classification of the currently traveled road. When this position 5 for the launching of the warning triangle has been reached, the warning triangle is automatically separated from the vehicle and then sets itself up automatically, and the vehicle continues to be decelerated and steered to standstill position 6. Upon reaching this position 5 for the launch of the warning triangle, stopping control 31 outputs a launch signal 34 for the warning triangle, which is forwarded to a launching device 35, which induces the detachment of the warning triangle from the vehicle. After the warning triangle has been launched by being released from a holder or by being expelled from a holder by a mechanism, it lands in the emergency lane or at the edge of the road where it automatically unfolds.

Figure 3:
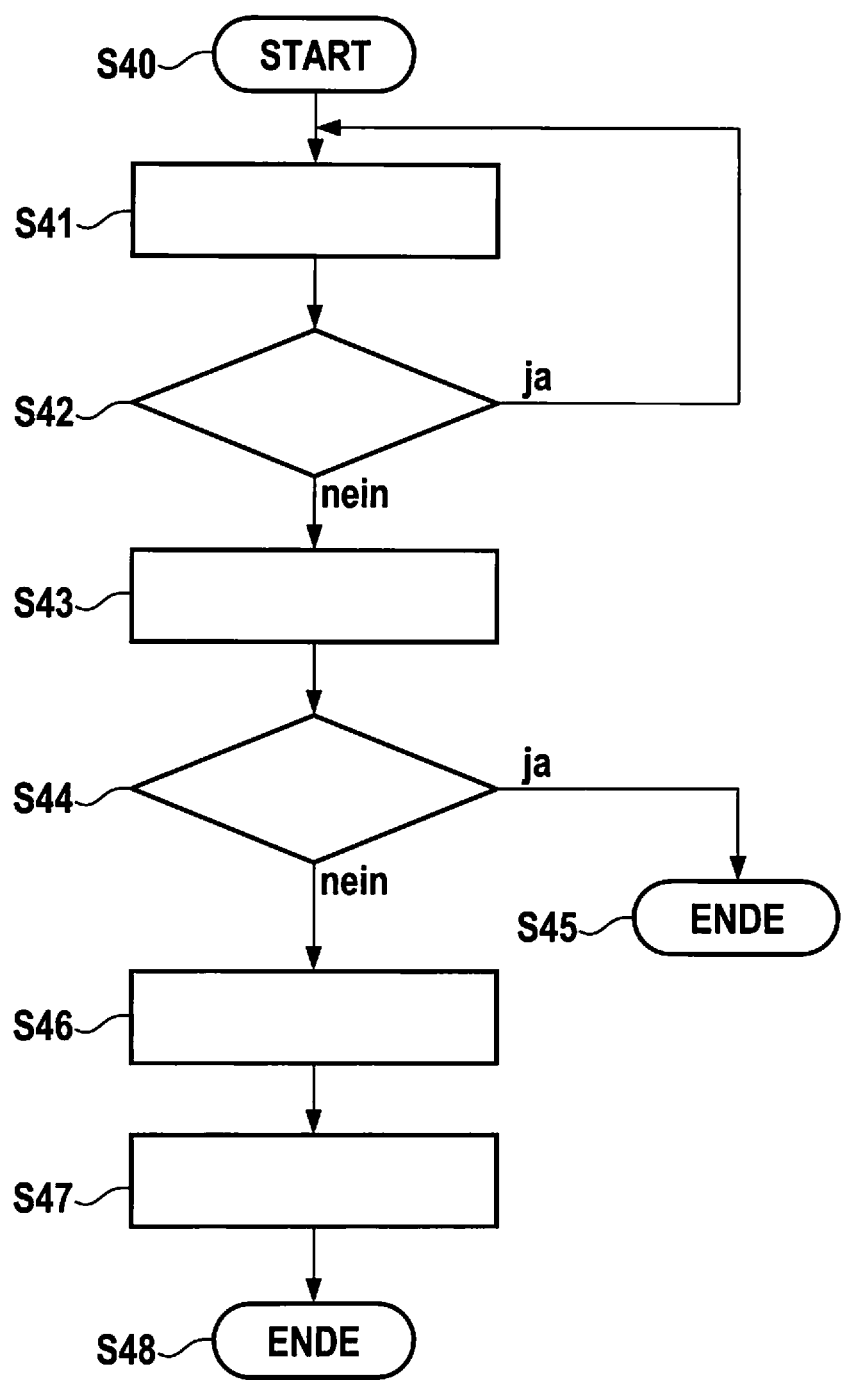
FIG. 3 is a flowchart that illustrates a method according to an example embodiment of the present invention.

FIG. 3 is a flowchart that illustrated a method according to an example embodiment of the present invention. The method begins in step S40, for instance when the vehicle is started or when special driving situations are encountered. For example, this special driving situation can be at hand when the driver of vehicle 1 operates an activation switch for an automatic driving mode or for an autonomous driving mode, and the vehicle is thereupon guided autonomously in the direction of an input target destination. This driving state of automatic driving or autonomous driving is represented by step S41. In the following step S42, it is regularly checked whether the automatic driving mode or the autonomous driving mode will still be possible in the future inasmuch as the vehicle control is able to perform the driving task to be managed. If the response to this query in step S42 is "yes" and the autonomous driving mode or the automatic driving mode will also be operable in the future, then the method branches back to step S41 by passing through a loop. If it was recognized in step S42 that the automatic driving mode or the autonomous driving mode will no longer be maintainable in the future, for instance because a technical defect of the vehicle has occurred or because the information required for the automatic driving mode is no longer available, or the vehicle is no longer able to manage the upcoming driving situation on its own, the method branches to "no" in step S42, whereupon a take-control prompt (TCP) is output to the driver in the following step S43. By this take-control prompt to the driver, the driver is prompted, acoustically, optically, haptically and/or kinetically, to again take over the control of the vehicle during time period t that follows the take-control prompt (TCP) to the driver, and to drive the vehicle manually from there.

In the following step S44, it is checked whether the driver has assumed the driving task during time period t of the take-control prompt to the driver, for instance in that the driver has deactivated the autonomous driving mode or the automatic driving mode by operating a control element, or in that the driver actively intervenes in the vehicle control by operating the accelerator, the brake pedal and/or the steering device, and thereby ends the automatic driving mode. In this case, step S44 branches to "yes" and the method ends in step S45 because the automatic driving mode or the autonomous driving mode is deactivated. If it was determined in step S44 that the driver of vehicle 1 has failed to perform the driving tasks after time period t has elapsed, then the method branches to "no" and the stopping state is started in step S46, as it is illustrated in FIG. 1 by position 4 of vehicle 1. Among other things, a future standstill position 6 of the vehicle is calculated; in addition, a launch position 5 for warning triangle 7 is ascertained as a function of a performed road classification.

On account of the information from a navigation system 14, it is possible to identify the type of traveled road. A distinction is able to be made between an urban road within city limits, a country road or an interstate highway or a road that is developed similar to an interstate highway. In addition or as an alternative, it is possible to identify the type of traveled road with the aid of a video camera provided in vehicle 1, which records the area in front of the vehicle and controls assistance functions, and to thereby specify the type of road as an alternative to navigation system 14 or by plausibilizing the data of navigation system 14. Depending on the type of traveled road, it is advantageous to vary distance D at which warning triangle 7 is launched before arriving at standstill position 6 of vehicle 1. The faster the speeds commonly used on the identified type of road, the larger distance D that should be selected.

While executing the stopping state, vehicle 1 is guided along route 8 and steered to the edge of the road or to emergency lane 2 of road 2, depending on the structural situation of the traveled road. The vehicle is braked and possible warning functions such as the activation of the warning hazard flashers, the vehicle horn, or the placing of an electronic emergency call are additionally initiated. When vehicle 1 reaches position 5 according to FIG. 1 on its travel route 8, then the warning triangle is automatically dropped off, as shown by step S47, and automatically unfolded in order to warn following traffic of the vehicle parked at a standstill. In addition, the vehicle is decelerated until it is standing still so that it attains the standstill state at position 6 in FIG. 1, thereby ending the stopping state of the vehicle, and the vehicle is permanently parked. The method is terminated in step S48 after the stopping state has ended.

What is claimed is:

1. A method for a vehicle that is at least intermittently automatically guided on a route with an autonomous vehicle guidance in which a driver intervention is not required, the method comprising:
   during the automatic guidance, continuously checking, by processing circuitry, whether the automatic guidance is able to be maintained in the future; and
   responsive to a result of the checking being that the automatic guidance is not able to be maintained and must instead be terminated:
      the processing circuitry automatically transitioning the vehicle into a stopping state in which the vehicle is stopped at a standstill position;
      prior to the vehicle reaching the standstill position of the stopping state, calculating, by the processing circuitry, the standstill position at which the vehicle will be positioned in the stopping state; and
      the processing circuitry triggering a launch of a warning triangle mounted on the vehicle so that the warning triangle is positioned at a sufficient distance from the calculated standstill position of the vehicle.

2. The method of claim 1, wherein the transitioning into the stopping state includes a deceleration of the vehicle and a stopping of the vehicle at an edge of a lane or road or in an emergency lane.

3. The method of claim 1, wherein, prior to the launching, the warning triangle is accommodated in a holder on a bottom or rear of the vehicle.

4. The method of claim 3, wherein the launching of the warning triangle is performed by releasing the triangle from the holder.

5. The method of claim 1, wherein the launching of the warning triangle takes place by expelling the warning triangle from a sleeve.

6. The method of claim 1, wherein the sufficient distance is determined depending on a type of road traveled by the vehicle.

7. The method of claim 6, wherein the type of road traveled is determined by a supply of information of a navigation system or by evaluation of data of a camera installed in the vehicle and pointed in a travel direction of the vehicle.

8. The method of claim 1, wherein the warning triangle is in a folded-up state when being launched.

9. The method of claim 8, wherein the folded-up warning triangle unfolds automatically after being launched.

10. The method of claim 9, wherein the warning triangle is designed in such a way that it is automatically brought into a correct set-up position while unfolding.

11. The method of claim 1, wherein the warning triangle is designed in such a way that a warning surface of the warning triangle orients itself counter to the driving direction while unfolding.

12. The method of claim 1, wherein the warning triangle is shaped as a tetrahedron with three identical warning sides that each has at least one of warning symbols and reflectors.

13. The method of claim 1, wherein the warning triangle includes a radio transmitter that is activated during the launch and that emits a radio signal.

14. The method of claim 13, wherein the radio transmitter establishes a vehicle-to-vehicle connection or a vehicle-to-infrastructure connection, and transmits a position to receiving vehicles or to a receiving data server.

15. The method of claim 1, wherein the warning triangle includes a radio transmitter that is activated during the launch and that establishes a radio connection to the vehicle.

16. The method of claim 15, wherein the vehicle receives a radio signal of the radio transmitter of the warning triangle, establishes a vehicle-to-vehicle connection or a vehicle-to-infrastructure connection via an additional transmit and receive device, and transmits a current position of the warning triangle to the vehicles that receive the signals of the vehicle-to-vehicle connection or to a server that receives signals of the vehicle-to-infrastructure connection.

17. A device for a vehicle that is at least intermittently automatically guided on a route with an autonomous vehicle guidance in which a driver intervention is not required, the device comprising:
processing circuitry that interfaces with a drive mechanism of the vehicle and a trigger of the vehicle, wherein the processing circuitry is configured to:
during the automatic guidance, continuously check whether the automatic guidance is able to be maintained in the future; and
responsive to a result of the checking being that the automatic guidance is not able to be maintained and must instead be terminated:
control the drive mechanism to automatically transition the vehicle into a stopping state in which the vehicle is stopped at a standstill position;
prior to the vehicle reaching the standstill position of the stopping state, calculate the standstill position at which the vehicle will be positioned in the stopping state; and
control the trigger to launch a warning triangle mounted on the vehicle so that the warning triangle is positioned at a sufficient distance from the calculated standstill position of the vehicle.

\* \* \* \* \*